United States Patent
Sawada

[19]

[11] Patent Number: 5,954,406
[45] Date of Patent: Sep. 21, 1999

[54] BRAKE CONTROL APPARATUS FOR A VEHICLE

[75] Inventor: Mamoru Sawada, Yikkaichi, Japan

[73] Assignee: Denso Corporation, Kariya, Japan

[21] Appl. No.: 08/832,285

[22] Filed: Apr. 3, 1997

[30] Foreign Application Priority Data

Apr. 8, 1996 [JP] Japan ................................ 8-085521
Nov. 29, 1996 [JP] Japan ................................ 8-319806

[51] Int. Cl.⁶ .................................................. B60T 8/32
[52] U.S. Cl. ............................. 303/122.09; 303/122.11; 303/122.12; 303/122.13; 303/10; 303/116.1; 303/DIG. 4; 303/113.5
[58] Field of Search ........................... 303/122.09, 122, 303/122.12, 122.13, 122.14, 15, 155, 10–12, 3, 84.1, 166, 84.2, 113.1, 113.2, 113.3, 113.4, 113.5, 114.1, 114.2, 114.3, 116.4, 116.1, 119.1, DIG. 1, DIG. 2, DIG. 3, DIG. 4, 122.11; 60/545, 547.1, 550, 565, 566, 582; 188/355–359

[56] References Cited

U.S. PATENT DOCUMENTS

| | | | |
|---|---|---|---|
| 2,705,870 | 4/1955 | Holton | 303/12 |
| 3,675,422 | 7/1972 | Drutchas et al. | 60/582 |
| 3,677,607 | 7/1972 | Schultz et al. | 303/10 |
| 3,782,781 | 1/1974 | Lewis | 303/10 |
| 3,967,536 | 7/1976 | Bach | 303/10 |
| 3,995,529 | 12/1976 | Bach et al. | |
| 4,007,593 | 2/1977 | Baker | 60/548 |
| 4,020,636 | 5/1977 | Harries | 60/581 |
| 4,738,112 | 4/1988 | Nomura et al. | 303/12 |
| 4,755,008 | 7/1988 | Imoto et al. | 303/116.1 |
| 4,792,192 | 12/1988 | Tveitane | 303/14 |
| 4,812,777 | 3/1989 | Shirai | 303/14 |
| 4,824,181 | 4/1989 | Tomala | 303/84.2 |
| 4,892,364 | 1/1990 | Burgdorf | |
| 4,902,075 | 2/1990 | Uno et al. | 303/14 |
| 5,044,697 | 9/1991 | Longyear et al. | 303/14 |
| 5,106,170 | 4/1992 | Matsuda et al. | 303/113.5 |
| 5,281,014 | 1/1994 | Volz | |
| 5,427,442 | 6/1995 | Heibel | |
| 5,472,267 | 12/1995 | Tanguy et al. | 303/84.2 |
| 5,480,223 | 1/1996 | Hashida et al. | 303/114.3 |
| 5,531,509 | 7/1996 | Kellner et al. | 303/114.1 |
| 5,588,718 | 12/1996 | Winner et al. | 303/14 |
| 5,709,438 | 1/1998 | Isakson et al. | 303/113.4 |
| 5,779,329 | 7/1998 | Takeshima | 303/155 |

FOREIGN PATENT DOCUMENTS

| | | |
|---|---|---|
| 47-19273 | 9/1972 | Japan . |
| 60-63373 | 5/1975 | Japan . |
| 52-36265 | 3/1977 | Japan . |
| 62-149547 | 7/1987 | Japan . |
| 3-501007 | 3/1991 | Japan . |
| 6-191394 | 7/1994 | Japan . |
| 8-175360 | 7/1996 | Japan . |

*Primary Examiner*—Douglas C. Butler
*Attorney, Agent, or Firm*—Pillsbury Madison & Sutro LLP

[57] ABSTRACT

A booster and a pressure amplifying device are provided as devices performing a brake assist. Further a pressure sensor which detects master-cylinder pressure is provided. While the braking is applied to the vehicle, the malfunction of the booster can be detected based on master-cylinder pressure detected by the pressure sensor. If the malfunction of the booster is detected, a pump in the pressure amplifying device is driven as an substitute for the booster. As a result, a required brake assist can be performed to ensure high braking force. Accordingly, the brake control apparatus can enhance safety during vehicle operation.

18 Claims, 13 Drawing Sheets

BRAKE CONTROL APPARATUS FOR A VEHICLE

CROSS REFERENCE TO RELATED APPLICATION

The present invention is based upon and claims the benefit of priority of the prior Japanese Patent Applications No. Hei 8-85521 filed on Apr. 8, 1996 and No. Hei 8-319806, the contents of which are incorporated by reference.

BACKGROUND OF THE INVENTION

1. Field of the Invention

The present invention relates to a vehicular brake control apparatus exhibiting high braking force, and more particularly, to a brake control apparatus which can provide, to wheel cylinders, brake-fluid pressure higher than master-cylinder pressure generated by a master cylinder, when obtaining a higher braking force is desirable on a road having a high friction coefficient or the like.

2. Related Arts

U.S. Pat. No. 5,427,442 discloses a brake fluid pressure boosting apparatus for an automobile which boosts brake-fluid pressure applied to wheel cylinders to obtain an optimal braking force. In the brake fluid pressure boosting apparatus, a boosting effect by a brake-pressure booster is intensified in a state of panic braking wherein a driver hesitates to depress a brake pedal with maximum force. As a result, more than normal wheel-cylinder pressure is applied to the wheel cylinders in response to a driver's pedal-depression force, and high braking force is secured.

This apparatus, however, uses the same brake-pressure booster to boost brake fluid pressure under normal braking as well as to intensify the boosting effect in a panicky situation. As a result, there arises a possibility that if the brake-pressure booster fails, not only will not the boosting effect be intensified but the brake fluid pressure will not be boosted under normal braking.

SUMMARY OF THE INVENTION

It is an object of the present invention to provide a brake control apparatus for a vehicle which can reliably ensure a high braking force when a higher braking force is required, just like a sudden braking in a panicky situation.

To achieve this object, a brake assist is performed by a first increasing device and a second increasing device provided separately from the first increasing device in order to increase the braking force. A detecting device detects a malfunction or function deterioration of at least one of the first and second increasing devices.

Therefore, it can be determined by the detecting device whether the brake assist is properly performed with respect to a braking operation of a driver. If the driver recognizes the malfunction or function deterioration by warning the occurrence thereof, it is possible to enhance safety during vehicle operation.

The first increasing device may perform the brake assist during a normal braking operation. If the malfunction or function deterioration of the first increasing device has been detected, the second increasing device boosts an operating force generated by a braking operation of a driver instead of the first increasing device, and brake fluid pressure corresponding to the boosted operating force is applied to a wheel braking force generating device.

Therefore, even when the malfunction or function deterioration of the first increasing device has occurred, the brake assist can be performed as a result of the second increasing device generating a required brake fluid pressure. As a result, safety during vehicle operation can be enhanced.

When a booster (vacuum booster or hydraulic booster of the known art) is used as the first increasing device, for example a leakage of pressure introduced therein is exemplified as a malfunction of the booster. That is, in a vacuum booster for example, if atmospheric pressure or vacuum cannot be introduced therein, the vacuum booster cannot exhibit an expected boosting effect even when the driver depresses the brake pedal.

Some example function deteriorations of the booster include insufficient vacuum introduced from an intake manifold of an engine, the failure of a pump where pressure in the booster is controlled by the pump, a continuous and strong braking operation causing a lowering in the performance of the brake system repeated starting and stopping of the vehicle are repeated, a creep phenomenon of the vehicle has occurred resulting from an increase in the viscosity of lubricating oil in a transmission system like first idling control (idling up to heat up an engine), insufficient atmospheric pressure (for example, when the vehicle is running on the highlands). A the function deterioration of the booster may also include a falling in dead point pressure of the booster.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS (First Embodiment)

A first embodiment according to the present invention will be described hereinafter with reference to the drawings.

Figure 1:
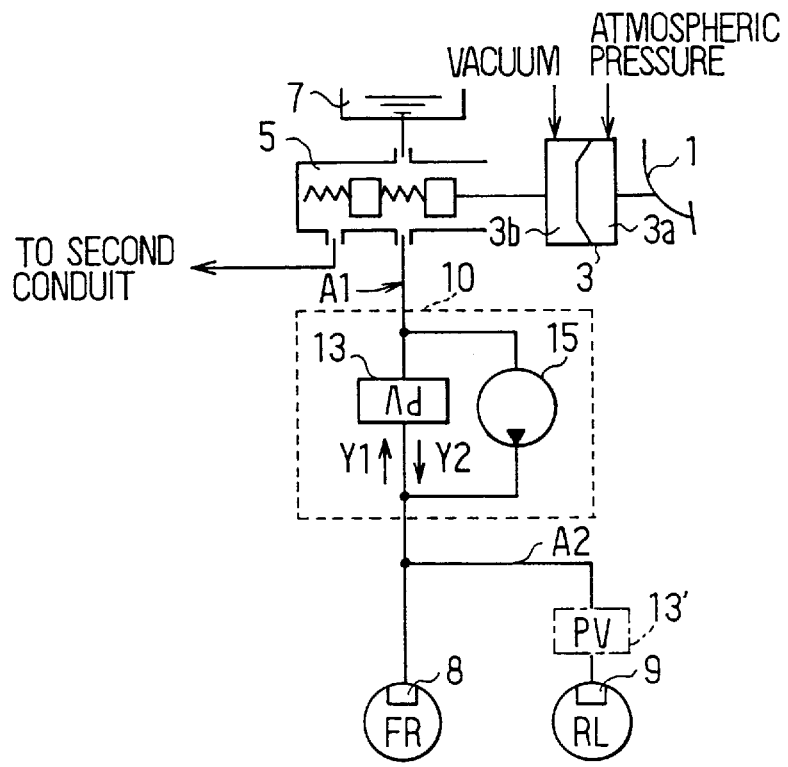
FIG. 1 is a model diagram indicating a structure of a brake control apparatus according to a first embodiment of the present invention.

FIG. 1 is a structural view indicating a brake control apparatus according to the first embodiment of the present invention. In the first embodiment, the brake control apparatus is applied in a vehicle having a diagonal brake-fluid conduit system provided with respective brake-fluid conduits connecting a front-right wheel cylinder with a rear-left wheel cylinder and connecting a front-left wheel cylinder with a rear-right wheel cylinder in a front-wheel drive four-wheeled vehicle.

In FIG. 1, a brake pedal 1 depressed by a driver when applying a braking force to the vehicle is connected to a booster 3 (as a first increasing device performing a brake assist), and depression force applied to the pedal 1 and pedal stroke thereof are conveyed to this booster 3. The booster 3 has at least two chambers, a first chamber and a second chamber, and a for example the first chamber can be set as an atmospheric-pressure chamber and the second chamber can be set as a vacuum chamber. Intake-manifold vacuum of an engine, vacuum generated by a vacuum pump or the like is employed to introduce a vacuum in the vacuum chamber. Accordingly, this booster 3 directly boosts the driver's pedal depression or pedal stroke by a pressure differential of the atmospheric-pressure chamber and the vacuum chamber. The booster 3 has a push rod or the like to convey the depression force or pedal stroke boosted in this way to a master cylinder 5, and this push rod generates master-cylinder pressure PU by compressing a master piston disposed in the master cylinder 5.

The master cylinder 5 is provided with an independent master reservoir 7 to supply brake fluid inside the master cylinder 5 or to accumulate excess brake fluid from the master cylinder 5.

The master-cylinder pressure PU generated in the master cylinder 5 is conveyed to brake fluid within a first conduit A linking the master cylinder 5 and a first wheel cylinder (W/C) 8 disposed in the front-right wheel FR to impart braking force to this wheel, and the master 5 and a second wheel cylinder 9 disposed in the rear-left wheel RL to impart braking force to this wheel. The master-cylinder pressure PU is similarly conveyed also to a second conduit linking respective wheel cylinders disposed in the front-left wheel and the rear-right wheel to the master cylinder 5. However, because structure similar to the first conduit A can be employed for the second conduit, a detailed description will be omitted.

The first conduit A is made from two parts separated by a pressure-amplifying device 10 (a second increasing device which performs a brake assist) disposed in this first conduit A. That is to say, the first conduit A has a first conduit part A1 to receive the master-cylinder pressure PU in the interval from the master cylinder 5 to the pressure-amplifying device 10 and a second conduit part A2 in the interval from the pressure-amplifying device 10 to the first wheel cylinder 8.

The pressure-amplifying device 10 moves brake fluid of the first conduit part A1 to the second conduit part A2 and holds the pressure in the second conduit part A2 at a second brake-fluid pressure PL when the brake pedal 1 is depressed and the master-cylinder pressure PU is generated within the first conduit A. According to this first embodiment, the pressure-amplifying device 10 is composed of a proportioning control valve (PV) 13 and a pump 15.

The pump 15 is connected within the first conduit A in parallel with the proportioning control valve 13, and takes in brake fluid from the first conduit part A1 and discharges brake fluid to the second conduit part A2 during generation of the master-cylinder pressure PU.

When brake fluid has been moved from the first conduit part A1 to the second conduit part A2 by the pump 15 and the brake-fluid pressure of the second conduit part A2 has become the second brake-fluid pressure PL which is greater than the master-cylinder pressure PU, the proportioning control valve 13 acts to maintain this differential pressure (PL-PU).

In this way, the pressure-amplifying device 10, provided with the pump 15 and the proportioning control valve 13, moves the brake fluid of the first conduit part A1 (which has assumed the same pressure as the master-cylinder pressure PU accompanying depression of the brake pedal 1) to the second conduit part A2, and reduces the brake-fluid pressure within the first conduit part A1. The pressure-amplifying device 10 simultaneously maintains the differential pressure of the amplified second brake-fluid pressure PL within the second conduit part A2 and the master-cylinder pressure PU. The pressure-amplifying device 10 performs pressure amplification in this way.

The second brake-fluid pressure PL which has been caused to be greater than the master-cylinder pressure PU is applied to the first and second wheel cylinders 8 and 9, so that high braking force is ensured.

It is to be noted that a proportioning control valve 13' as well-known (being the same as the proportioning control valve 13) may be disposed at the second conduit part A2 to operate so that the brake fluid pressure applied to the second wheel cylinder 9 becomes smaller than the brake-fluid pressure applied to first wheel cylinder 8. The proportioning control valve 13' is provided to prevent the rear wheel, as far as possible, from falling into a locking state earlier than the front wheel in a case where load movement of the vehicle or the like has occurred during vehicle braking. However, explanation about an example that the proportioning control valve 13' is omitted will be given, hereinafter.

Next, a function of the proportioning control valve 13 will be described in detail.

Figure 2A:
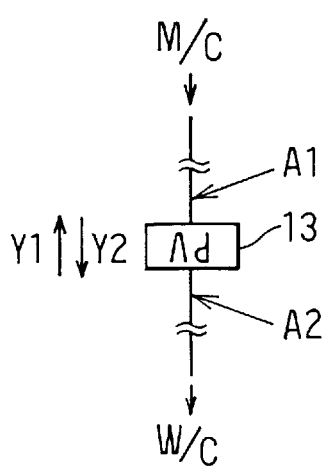
FIG. 2A is a drawing indicating a structure of a proportioning control valve in the first embodiment.
Figure 2B:
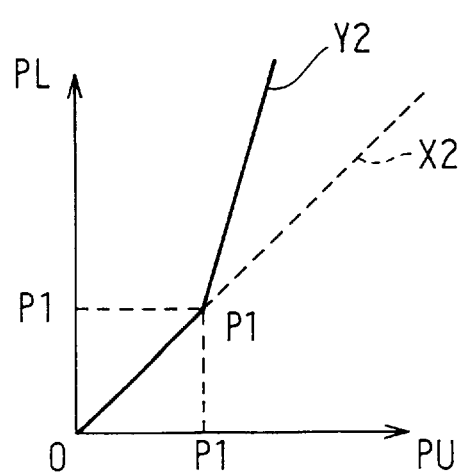
FIG. 2B is a graph illustrating characteristics of the proportioning control valve.

In the first embodiment, as shown in FIG. 2A, the proportioning control valve 13 is connected in reverse. The proportioning control valve 13 ordinarily acts to convey basic pressure of the brake fluid to a downstream side while attenuating the brake-fluid pressure with a predetermined attenuation ratio when the brake fluid is flowing in a normal direction (a direction of an arrow Y1 in FIG. 2A). Accordingly, when the proportioning control valve 13 is connected in reverse, the second conduit part A2 side comes to generate the foregoing basic pressure, and the first conduit part A1 side becomes the downstream side when the brake fluid flows from the second conduit part A2 to the first conduit part A1 through the proportioning control valve 13. Accordingly, as shown in FIG. 2B, when the second brake-fluid pressure PL within the second conduit part A2 has become not less than the split-point pressure P1 established for the proportioning control valve 13 accompanying an increase in the brake-fluid quantity within the second conduit part A2 due to the drive of the pump 15, the second brake-fluid pressure PL within the second conduit part A2 is conveyed to the first conduit part A1 in accordance with the slope of line Y2, i.e., the predetermined attenuation ratio. Accordingly, when the master-cylinder pressure PU in the first conduit part A1 is seen as a reference, the second brake-fluid pressure PL increased by the drive of the pump 15 comes to be held by this proportioning control valve 13 in a state amplified in an inverse relationship to the above-described predetermined attenuation ratio.

When brake fluid flows from the first conduit part A1 to the second conduit part A2 through the proportioning control valve 13, brake-fluid pressure similar to the basic pressure is conveyed to the downstream side without attenuating brake-fluid pressure. In this case, the basic-pressure side of the proportioning control valve 13 is the first conduit part A1 side, and the downstream side is the second conduit part A2 side.

Next a relationship between the pedal stroke of the brake pedal 1 and wheel-cylinder pressure will be described based on FIG. 3.

Figure 3:
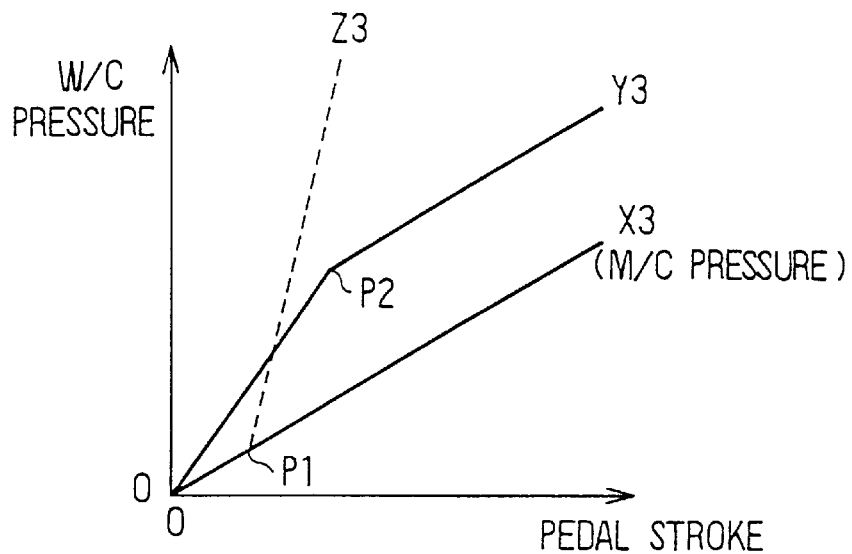
FIG. 3 is a graph indicating variation of wheel-cylinder pressure in the first embodiment.

It is to be noted that a line X3 in FIG. 3 represents a master-cylinder pressure relative to the pedal stroke when the brake assist is not performed, a line Y3 represents wheel-cylinder pressure relative to the pedal stroke when the booster 3 performs the brake assist, and a line Z3 represents wheel-cylinder pressure relative to the pedal stroke when the pressure amplifying device 10 performs the brake assist.

As apparent from FIG. 3, the booster 3 which is the first increasing device can increase wheel-cylinder pressure earlier than the line X3 as the pedal stroke becomes larger. However, after wheel-cylinder pressure has reached a split-point pressure P2, wheel-cylinder pressure is increased in accordance with the same slope as that of the line X3.

On the other hand, although the pressure amplifying device 10 which is the second increasing device is just capable of increasing wheel-cylinder pressure in accordance with the same slope as that of the line X3 until wheel-cylinder pressure reaches the split-point pressure P1, the pressure amplifying device 10 can increase wheel-cylinder pressure more rapidly than the line Y3 after wheel-cylinder pressure has reached the split-point pressure P1.

It is to be noted that the increasing rate of wheel-cylinder pressure increased by the booster 3 after wheel-cylinder pressure has reached the split-point pressure P2 and the increasing rate of wheel-cylinder pressure increased by the pressure amplifying device 10 after wheel-cylinder pressure has reached the split-point pressure P1 are constant. That is, the respective increasing rates do not change on the way.

Next, a structure and control processing to control the above-mentioned pressure amplifying device 10 and the like will be described.

Figure 4:
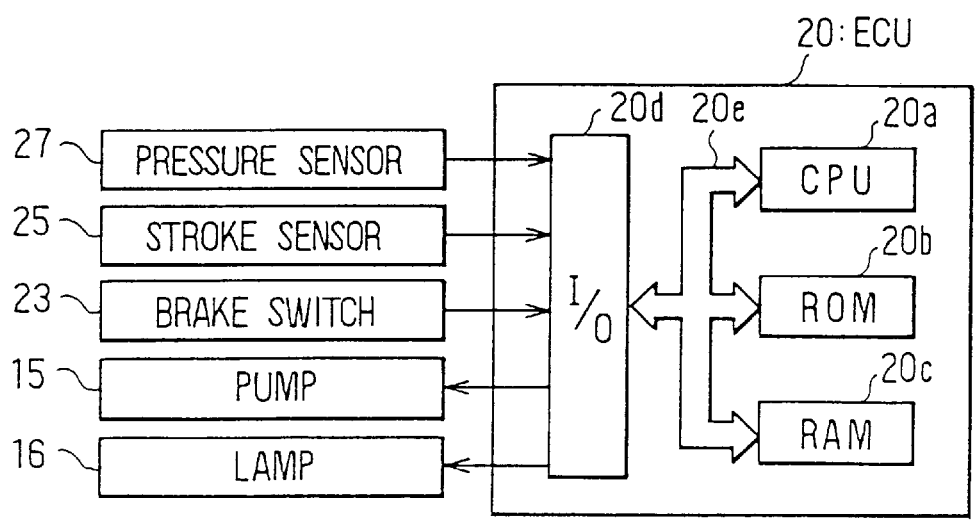
FIG. 4 is a block diagram indicating an electrical control unit of the first embodiment.

An electric control unit (ECU) 20 shown in FIG. 4 performs control for increasing braking forces of the wheels by the pressure amplifying device 10 moving brake fluid from the master cylinder 5 side to first and second wheel cylinders 8 and 9 side.

The ECU 20 is structured as a microcomputer provided with a CPU 20a, a ROM 20b, a RAM 20c, an input/output portion 20d, a bus line 20e, and the like of known art.

A brake switch 23 to detect depression of the brake pedal 1, pedal-stroke sensor 25 to detect the amount of depression of the brake pedal 1 and pressure sensor 27 to detect master-cylinder pressure are connected to the input/output portion 20d. In addition, the pump 15 to perform the brake assist by the pressure amplifying device 10 and a lamp 16 to warn a driver of the occurrence of malfunction in the booster 3 are connected to the input/output portion 20d. The pedal-stroke sensor 25 detects the amount of depression of the brake pedal 1 from a reference position where the brake pedal 1 has not been depressed.

Control processing to detect malfunction of the booster 3 and to be executed during the detection of the malfunction thereof, performed in the ECU 20 will be described based on the flowchart in FIG. 5.

In step S100, it is determined whether the brake pedal 1 has been depressed to brake the vehicle by determining whether the brake switch 23 is on or the pedal stroke detected by the pedal-stroke sensor 25 is not less than a predetermined value. When the determination herein is affirmative, the processing advances to step S110; when the determination is negative, the same determination is repeatedly executed.

In step S110, electromagnetic valves (not shown) or the like are driven to introduce atmospheric pressure and vacuum into the first chamber 3a and second chamber 3b, respectively, whereby the booster 3 performs the brake assist.

Next, in step S120, a processing is executed to detect the malfunction of the booster 3. For example, master-cylinder pressure is supposed to be increased to a predetermined value or more when the brake pedal 1 has been depressed to a predetermined stroke position. To ascertain this, master-cylinder pressure is read in based on a signal from the pressure sensor 27. It is to be noted that wheel-cylinder pressure can be used instead of master-cylinder pressure.

Next, in step S130, it is determined whether the malfunction of the booster 3 has occurred. That is, unless master-cylinder pressure is less than the predetermined value, it is determined that the malfunction of the booster 3 has occurred. When an affirmative determination is made herein, the processing advances to step S140; when a negative determination is made, the processing returns to step S100.

In step S140, the occurrence of the booster malfunction is warned by the lamp 16. A buzzer may be used instead of the lamp 16 as a warning device.

Next, in step S150, because the malfunction of the booster 3 has occurred, to prevent an unexpected operation of the booster 3, the operation of the booster 3 is terminated by driving the electromagnetic valves so as to introduce atmospheric pressure into both chambers 3a and 3b.

In the subsequent step S160, because the brake assist cannot be performed by the booster 3 which is the first increasing device, the pump 15 of the pressure amplifying device 10 which is the second increasing device is driven (in more detail, the pump motor to drive the pump 15 is started) to perform the brake assist.

In step S170, it is determined whether the brake is successively applied to the vehicle, the same way as step S100. When an affirmative determination is made, the processing returns to step S160 to continue to perform the brake assist by the pressure amplifying device 10; when a negative determination is made, the process advances to step S180.

In step S180, because the braking of the vehicle is terminated, the driving of the pump 15 in the pressure amplifying device 10 is stopped and the process returns to step S100.

In this way, according to this embodiment, the booster 3 and the pressure amplifying device 10 are provided as devices performing the brake assist, and the pressure sensor 27 which detects master-cylinder pressure is provided to detect the malfunction of the booster 3.

Therefore, while the braking is applied to the vehicle, the malfunction of the booster 3 can be detected based on master-cylinder pressure detected by the pressure sensor 27. If the malfunction of the booster 3 is detected, the pump 15 in the pressure amplifying device 10 is driven as an substitute for the booster 3. As a result, a required brake assist can be performed to ensure a high braking force. Accordingly, the brake control apparatus according to the first embodiment can enhance safety during the vehicle running.

It is to be noted that although the malfunction of the booster 3 is detected by using master-cylinder pressure in the first embodiment, the method of detecting the malfunction of the booster 3 is not limited to this. For example, a pressure sensor which detects pressures in the first and second chambers 3a and 3b can be used to detect the malfunction of the booster 3. If the booster 3 works normally, atmospheric pressure within a predetermined pressure range is introduced into the first chamber 3a and vacuum within a predetermined range is introduced into the second chamber 3b. Therefore, if the pressures in the first and second chambers 3a and 3b are out of the respective predetermined ranges, it can be determined that the malfunction of the booster 3 has occurred.

(Second Embodiment)

Next, the second embodiment will be described.

The second embodiment is different from the first embodiment in that the second embodiment does not use the booster but utilizes two pressure amplifying devices as the first and second increasing devices. It is to be noted that a description with respect to the same parts as the first embodiment is omitted or briefly given.

Figure 6:
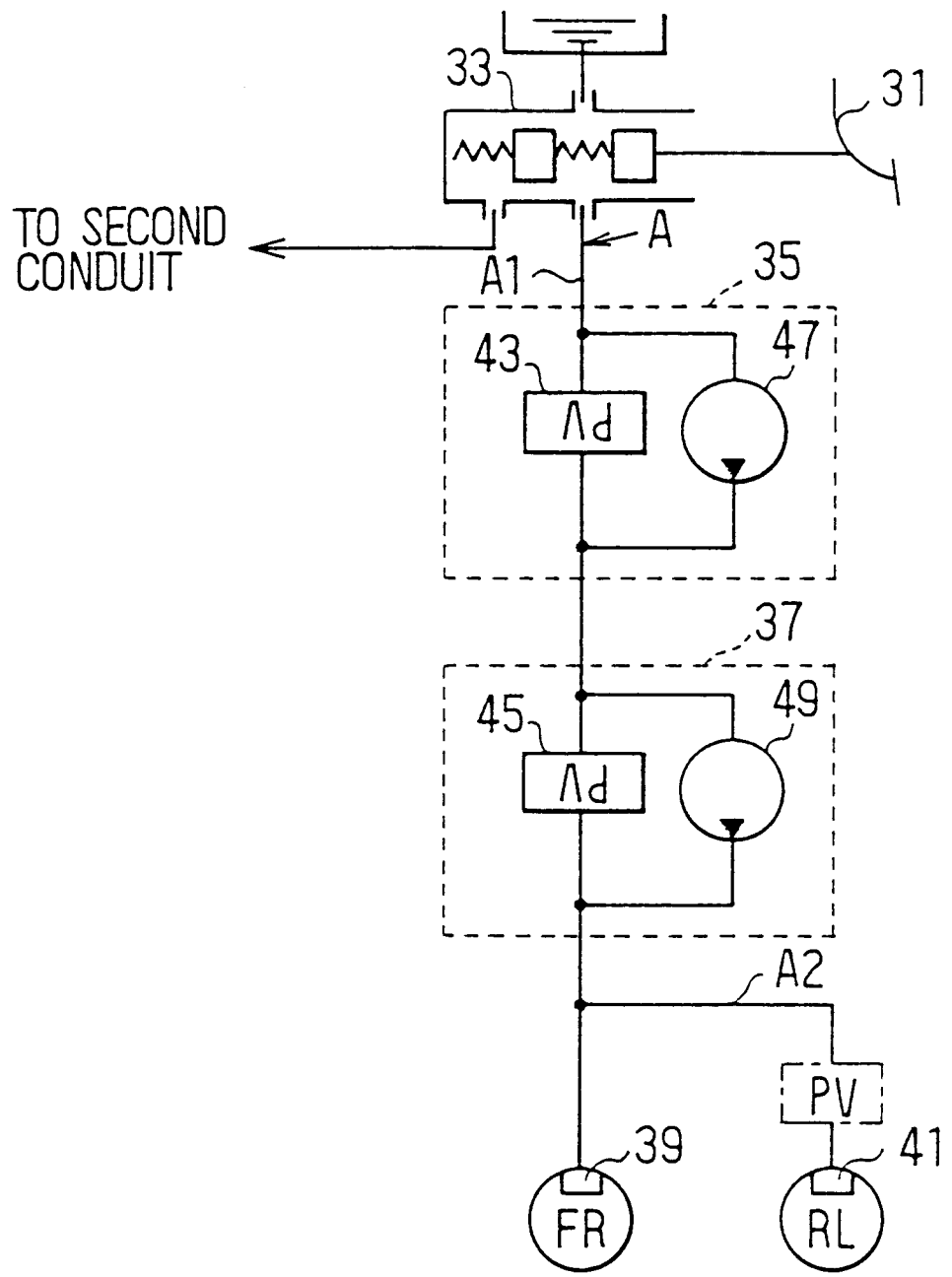
FIG. 6 is a model diagram indicating a structure of a brake control apparatus according to a second embodiment of the present invention.

As shown in a model diagram in FIG. 6, according to the second embodiment, a brake pedal 31 is directly connected to a master cylinder 33 without a booster disposed therebetween. A first conduit A from the master cylinder 33 is connected to wheel cylinders 39 and 41 disposed in a front-right wheel FR and rear-left wheel RL, respectively, through two pressure amplifying devices 35 and 37.

The pressure amplifying devices 35 and 37 correspond to the first and second increasing devices and are connected in series in the first conduit A. These pressure amplifying devices 35 and 37 are composed of pumps 47 and 49 and proportioning control valves 43 and 45 connected in reverse, respectively. Therefore, by driving the pumps 43 and 49, brake fluid pressure in a second conduit part A2 on the side of the wheel cylinders 39 and 41 can be boosted higher than that of the first conduit part A1 on the side of the master cylinder 33.

Next, a relationship between master-cylinder pressure and wheel-cylinder pressure will be described based on FIG. 7.

Figure 7:
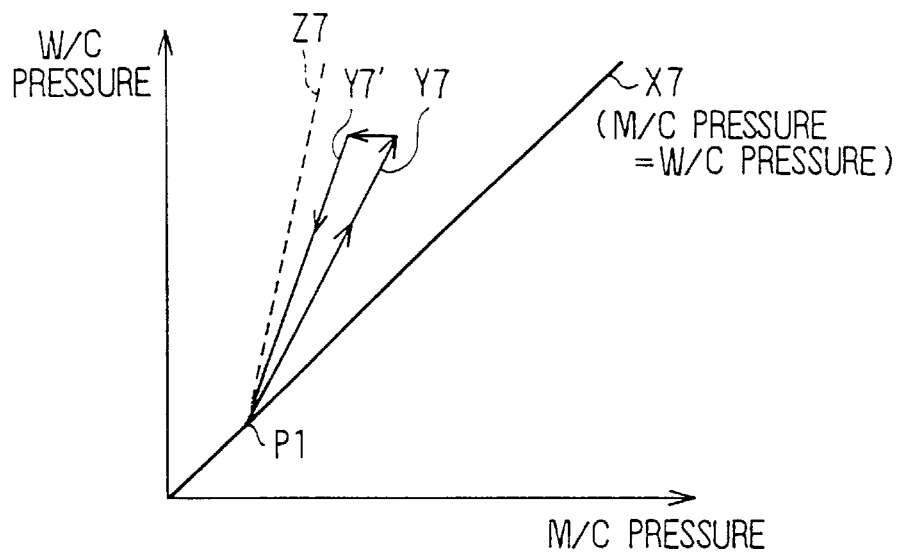
FIG. 7 is a graph indicating variation of wheel-cylinder pressure in the second embodiment.

It is to be noted that a line X7 in FIG. 7 represents wheel-cylinder pressure relative to master-cylinder pressure when the brake assist is not performed, a line Y7 represents wheel-cylinder pressure relative to master-cylinder pressure when either of the pressure amplifying devices 35 and 37 performs the brake assist, and a line Z7 represents wheel-cylinder pressure relative to master-cylinder pressure when both of the pressure amplifying devices 35 and 37 perform the brake assist.

As apparent from FIG. 7, both the pressure amplifying devices 35 and 37 increase wheel-cylinder pressure in accordance with the same slope as that of the line X7 until wheel-cylinder pressure has reached a split-point pressure P1. However, the pressure amplifying devices 35 and 37 can increase wheel-cylinder pressure earlier than the line X7 after wheel-cylinder pressure has reached the split-point pressure P1. It is to be noted that a line Y7' represents wheel-cylinder pressure when master-cylinder pressure reduces. Because master-cylinder pressure becomes lower when the brake pedal is released, it can be prevented that the braking force is unexpectedly reduced by reaction force from the brake pedal 31.

When both of the pressure amplifying devices 35 and 37 perform the brake assist, wheel-cylinder pressure can be increased earlier than the line Y7 after wheel cylinder pressure has reached the split-point pressure P1, whereby high braking force can be obtained.

It is to be noted that the increasing rate of wheel-cylinder pressure increased by the pressure amplifying devices 35 and 37 after wheel-cylinder pressure has reached the split-point pressure P1 are constant. That is, the increasing rate does not change on the way.

Next, a structure to control the above-mentioned pressure amplifying devices 35 and 37 and the like will be described.

Figure 8:
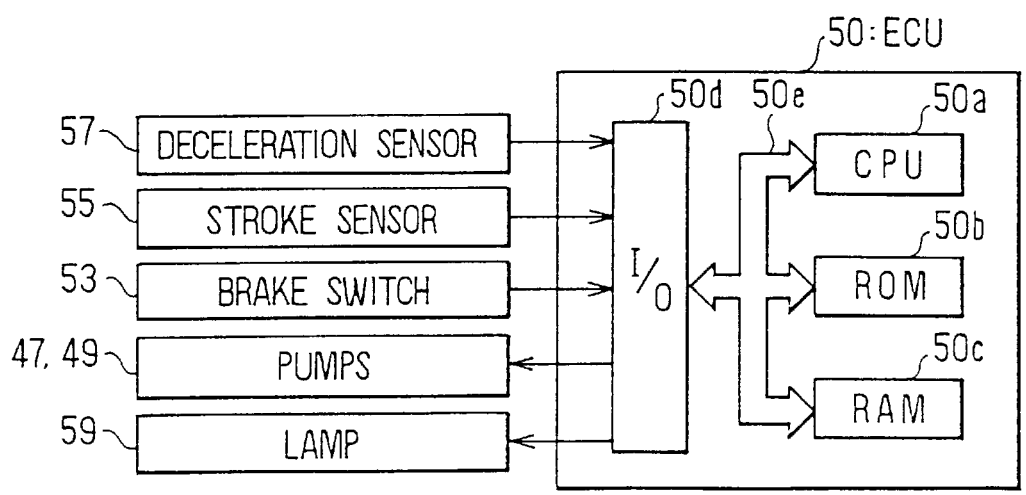
FIG. 8 is a block diagram indicating an electrical control unit of the second embodiment.

An electric control unit (ECU) 50 shown in FIG. 8 is structured as a microcomputer provided with a CPU 50a, a ROM 50b, a RAM 50c, an input/output portion 50d, a bus line 50e, and the like, similarly to the first embodiment.

A brake switch 53, a pedal-stroke sensor 55 and a deceleration sensor 57 to detect deceleration of a vehicle body are connected to the input/output portion 50d. In addition, the pumps 47 and 49 in the pressure amplifying devices 35 and 37 and a lamp 59 to warn a driver of the occurrence of malfunction in the pressure amplifying device 35 are connected to the input/output portion 20d.

Control processing to detect the malfunction of the pressure amplifying device 35 and to be executed during the detection of the malfunction thereof, performed in the ECU 50 will be described. It is to be noted that because most of the control processing is common with that illustrated in FIG. 5, the description thereof is omitted and only the features of the second embodiment corresponding to steps S120 and S130 in FIG. 5 is described based on the flowchart in FIG. 9.

In step S200, the pedal stroke PS is detected based on a signal from the pedal-stroke sensor 55.

In step S210, it is determined whether the detected pedal stroke PS exceeds a reference value kPS representing that the vehicle is braked. When an affirmative determination is made therein, the processing advances to step S220; when a negative determination is made, the processing returns to step S200.

In step S220, a vehicular body deceleration G is detected based on a signal from the deceleration sensor 57.

In step S230, it is determined whether the detected vehicular body deceleration G is lower than a reference value kG representing that the vehicle is in a braked condition. When the determination therein is affirmative, the processing advances to step S240; when the determination is negative, the processing returns to step S220.

Figure 9:
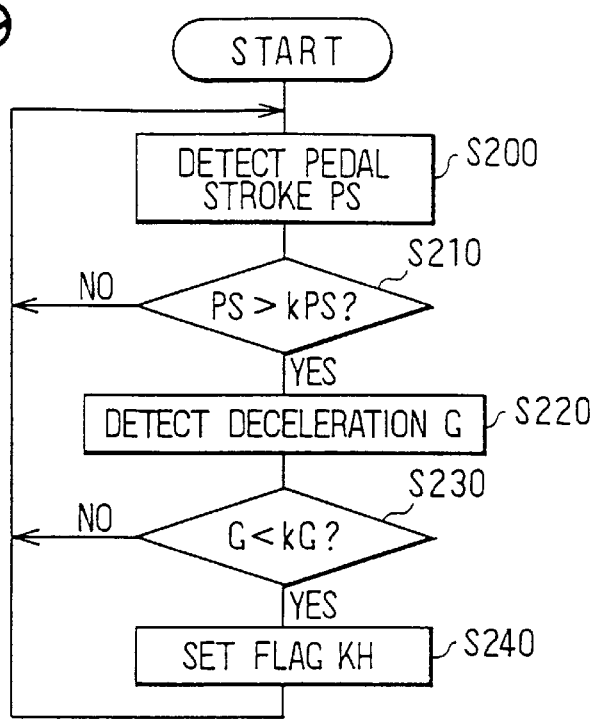
FIG. 9 is a flowchart indicating control processing in the second embodiment.

In step S240, because the sufficient deceleration of the vehicle body does not generate, it is considered that the malfunction of the pressure amplifying device 35 has occurred. Therefore, a malfunction flag KH is set to warn a driver of the occurrence of the malfunction in the pressure amplifying device 35, and the processing shown in FIG. 9 is terminated. Thereafter, the same processing as that shown in step S140 and the following steps is performed.

In this way, according to the second embodiment, first and second pressure amplifying devices 35 and 37 are provided as devices which perform the brake assist, and the stroke sensor 55 and deceleration sensor 57 are provided to detect the malfunction of the first pressure amplifying device 35.

Therefore, while the braking is applied to the vehicle, a malfunction of the pressure amplifying device 35 can be detected based on the pedal stroke PS and vehicular body deceleration G. If a malfunction of the pressure amplifying device 35 is detected, the pump 49 in the second pressure amplifying device 37 is promptly driven. As a result, a required brake assist can be performed to achieve a high braking force. Accordingly, the brake control apparatus according to the second embodiment can enhance safety during operation, similar to the first embodiment.

It is to be noted that although the malfunction of the pressure amplifying device 35 was detected by using the pedal stroke PS, the method of detecting the malfunction thereof is not limited to this. For example, a pressure sensor which detects a depressing force applied to the brake pedal 31 can be used, while the malfunction of the pressure amplifying device 35 is determined in the same way as described above.

Further, the malfunction of the pressure amplifying device 35 was detected by using the vehicular body deceleration G. However, for example, a wheel deceleration G is calculated based on an output from a wheel speed sensor and the same determination as described above can be made based on the calculated wheel deceleration G.

Alternatively, a voltage sensor (or current sensor which detects voltage applied to the pump 47 in the first pressure amplifying device 35 may be provided to detect the malfunction of the pump 47. Further, voltage sensors may be provided to both the pressure amplifying devices 35 and 37 to detect malfunctions of the respective pumps 47 and 49.

When it is determined based on a depressed state of the brake pedal 33 that sudden braking is made in a panic situation, braking force may be greatly boosted by causing both the pressure amplifying devices 35 and 37 to perform the brake assist simultaneously. In this case, wheel-cylinder pressure is rapidly increased as illustrated by the line Z7 in FIG. 7.

Figure 10:
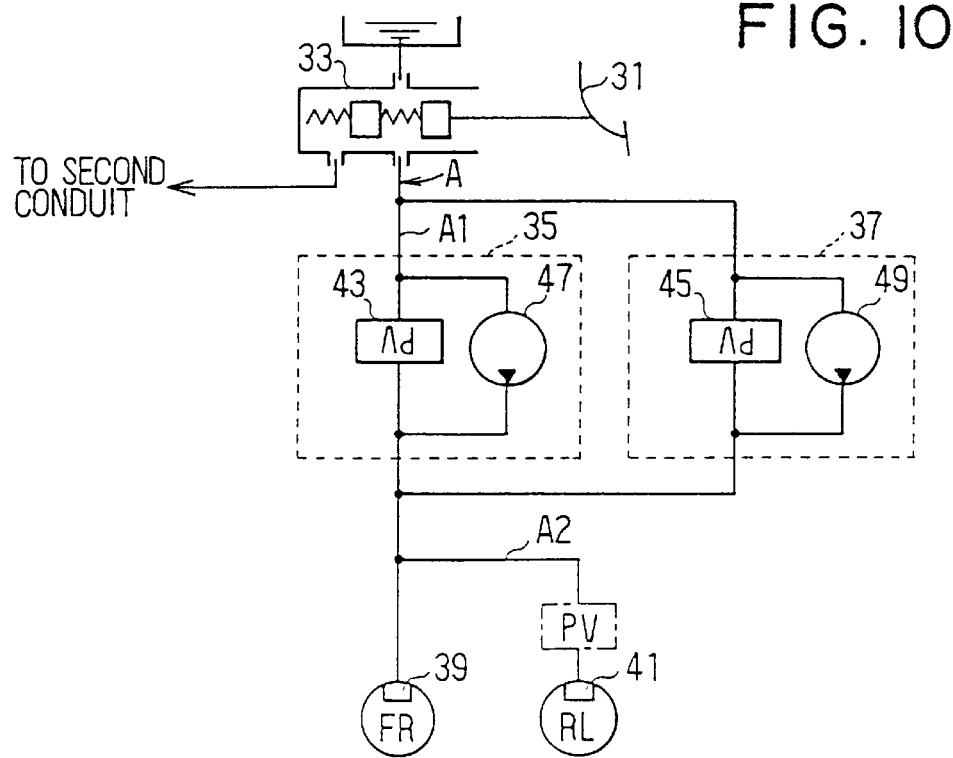
FIG. 10 is a model diagram indicating a structure of a brake control apparatus according to a modification of the second embodiment.

The pressure amplifying devices 35 and 37 are connected in series in the second embodiment, however, they may be connected in parallel as illustrated in FIG. 10. In this case, the brake control apparatus shown in FIG. 10 can obtain the same effects as the second embodiment.

(Third Embodiment)

Next, the third embodiment will be described.

The third embodiment is different from the first and second embodiments in that the first and second increasing devices perform the brake assist in a normal braking and if the malfunction of the first increasing device occurs, the increasing rate of the second increasing device is changed.

It is to be noted that a description with respect to the same parts as the first embodiment is omitted or briefly given.

Figure 11:
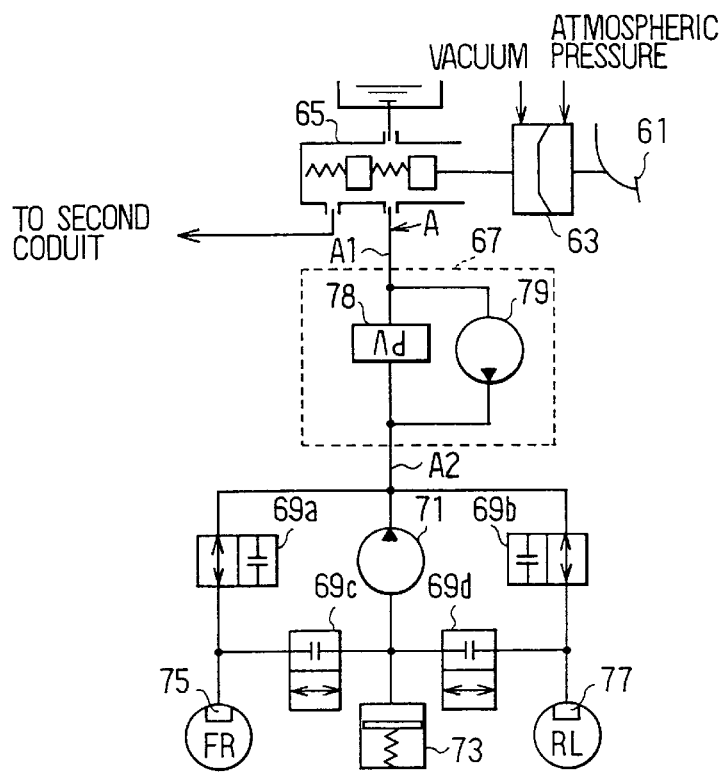
FIG. 11 is a model diagram indicating a structure of a brake control apparatus according to a third embodiment.

As shown in a model diagram in FIG. 11, according to the third embodiment, a brake pedal 61 is connected to a master cylinder 65 via a booster 63. A first conduit A from the master cylinder 65 is connected to wheel cylinders 75 and 77 disposed in a front-right wheel FR and rear-left wheel RL, respectively. There are electromagnetic valve 69a to 69d, pump 71 and reservoir 73 which are to execute antiskid brake control between the pressure amplifying device 67 and the wheel cylinders 75 and 77.

The booster 63 corresponding to the first increasing device performs the brake assist at a constant boosting rate.

The pressure amplifying device 67 corresponding to the second increasing device is composed of a pump 79 and proportioning control valve 78 connected in reverse.

In the third embodiment, if the booster 63 is in trouble, the assisting force of the brake assist performed by the pressure amplifying device 67 is increased by changing the rotational speed of the pump 79. It is to be noted that detection of the malfunction of the booster 63 can be made based on the relationship between pedal stroke and master cylinder pressure or the like, as described in the first embodiment.

Next, a relationship of wheel-cylinder pressure relative to master-cylinder pressure and the pedal stroke in the above-described structure will be described based on FIG. 12.

Figure 12:
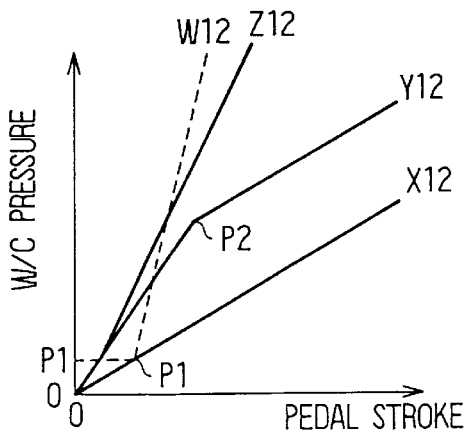
FIG. 12 is a graph indicating variation of wheel-cylinder pressure in the third embodiment.

In FIG. 12, a line X12 represents master-cylinder pressure relative to the pedal stroke when the brake assist is not performed, a line Y12 represents wheel-cylinder pressure relative to the pedal stroke when the booster 63 performs the brake assist, a line Z12 represents wheel-cylinder pressure relative to the pedal stroke when the pump 79 of the pressure amplifying device 67 is driven at a basic rotational speed, and a line W12 represents wheel-cylinder pressure relative to the pedal stroke when the pump 79 is driven at an increased rotational speed.

As apparent from FIG. 12, when both the booster 63 and the pressure amplifying device 67 work normally, they increase wheel-cylinder pressure in response to the increase of the pedal stroke as shown by the lines Y12 and Z12.

However, when the malfunction of the booster 63 has occurred, to compensate the deficiency of the booster 63, the pump 79 of the pressure amplifying device 67 is driven at a higher rotational speed than normal. As a result, as shown by the line W12 in FIG. 12, although wheel-cylinder pressure is identical with master-cylinder pressure until wheel-cylinder pressure has reached the split-point pressure P1, after wheel-cylinder pressure becomes the split-point pressure P1, assisting force of the brake assist performed by the pressure amplifying device 67 is increased more rapidly than normal (i.e., the increasing rate of wheel-cylinder pressure is changed to be higher). Therefore, it is possible to ensure high braking force even when the booster 63 falls in trouble.

Because the structure of an electronic control unit and the control processing performed thereby in the third embodiment is mostly the same as those in the first embodiment, only different points therebetween will be described briefly.

Figure 5:
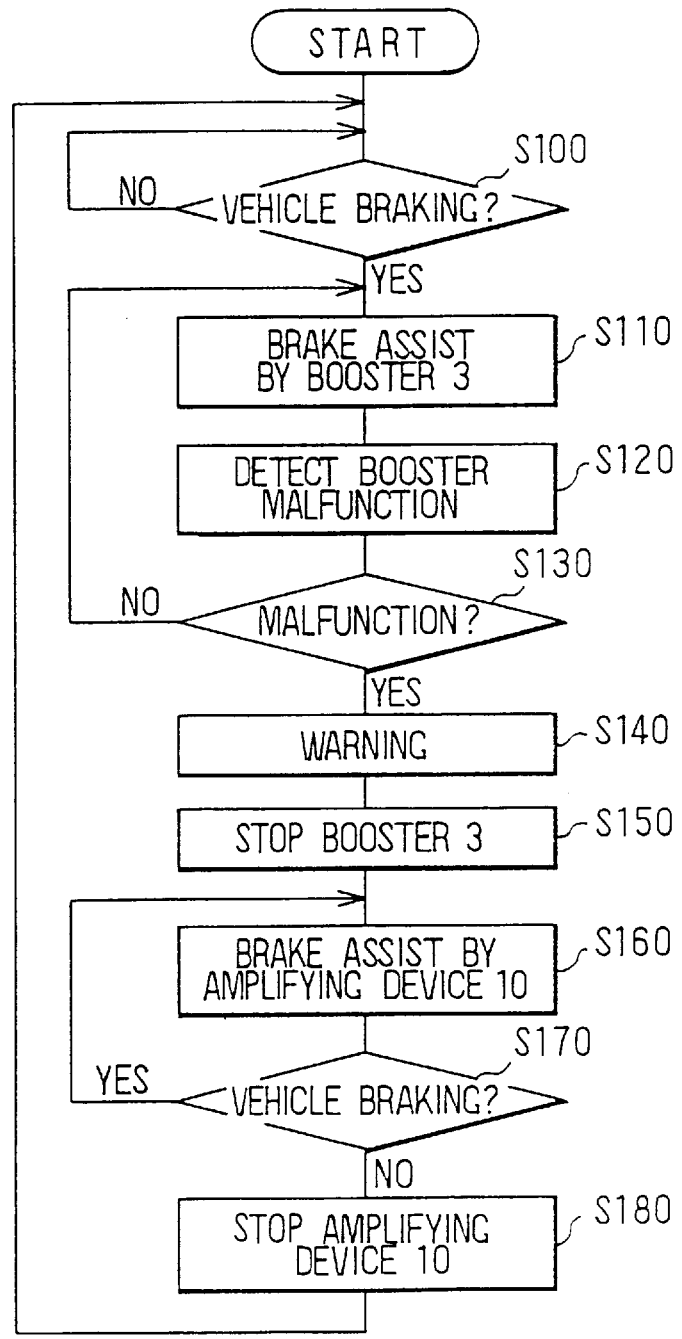
FIG. 5 is a flowchart indicating control processing in the first embodiment.

In the first embodiment, only the booster 3 performed the brake assist at step S110 in FIG. 5. On the other hand, in the third embodiment, both the booster 63 and the pressure amplifying device 67 perform the brake assist simultaneously. If the booster 63 is normal, the rotational speed of the pump 79 in the pressure amplifying device 67 is set to the basic rotational speed.

Further, in the third embodiment, the rotational speed of the pump 79 in the pressure amplifying device 67 is increased from the basic rotational speed in place of the processing in step S160 in FIG. 5.

In this way, in the third embodiment, the booster 63 and the pressure amplifying device 67 are provided as devices performing the brake assist. When the vehicle is braked, the brake assist is ordinarily executed by driving both the booster 63 and the pressure amplifying device 67. However, when the malfunction of the booster 63 has been detected, the rotational speed of the pump 79 in the pressure amplifying device 67 is increased, thereby performing the braking assist required to ensure a high braking force.

Therefore, the brake control apparatus according to the third embodiment can enhance safety during vehicle operation, similarly to the first embodiment.

(Fourth Embodiment)

Next, the fourth embodiment will be described.

The fourth embodiment has the same structure as the second embodiment. For example, in the fourth embodiment, two pressure amplifying devices are used as the first and second increasing devices. However, the fourth embodiment is different in the control processing from the second embodiment. It should be noted that a description of the same structures as those in the second embodiment is omitted or briefly given and the same numbers as those in the second embodiment are used to denote corresponding parts.

The structure of the brake control apparatus in the third embodiment is identical with that of the second embodiment illustrated in FIG. 6. That is, both of the pressure amplifying devices 35 and 37 correspond to the first and second increasing devices and are connected in series in the first conduit A. Each of the pressure amplifying devices 35 and 37 is composed of the pump 47, 48 and the proportioning control valve 43, 45 connected in reverse.

In the fourth embodiment, during normal braking of the vehicle, the brake assist is executed by driving both the pumps 47 and 49 of the pressure amplifying devices 35 and 37 at a basic rotational speed. If either one of the pressure amplifying devices 35 and 37 falls in trouble, the rotational speed of the pump of the pressure amplifying device which can work normally is increased, whereby the remaining normal pressure amplifying device can perform a similar brake assist to that performed when both the pressure amplifying devices 35 and 37 work normally.

It is to be noted that the malfunction of the pressure amplifying devices 35 and 37 can be detected, for example, by using the voltage sensor or the like in the same way as the second embodiment.

Next, a relationship between master-cylinder pressure and wheel-cylinder pressure in the structure described above will be explained based on FIG. 13.

Figure 13:
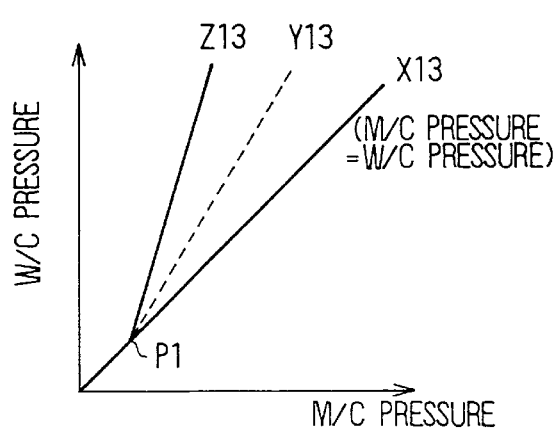
FIG. 13 is a graph indicating variation of wheel-cylinder pressure in the fourth embodiment.

It is to be noted that a line X13 in FIG. 13 represents wheel-cylinder pressure relative to master-cylinder pressure when the brake assist is not performed, a line Y13 represents wheel-cylinder pressure relative to master-cylinder pressure when either of the pressure amplifying devices 35 and 37 performs the brake assist, and a line Z13 represents wheel-cylinder pressure relative to master-cylinder pressure when either one of the pressure amplifying devices 35 and 37 falls in trouble, and the rotational speed of the pump in the other pressure amplifying device is increased. A gradient of the line Z13 is the same as that when both of the pressure amplifying devices 35 and 37 are driven to perform the brake assist.

As apparent from FIG. 13, when both the pressure amplifying devices 35 and 37 work normally during the vehicle braking, wheel-cylinder pressure increases in accordance with the line Z13. If either one of the pressure amplifying devices 35 and 37 falls in trouble, the rotational speed of the pump in the other pressure amplifying device which can still work normally is increased, i.e., the increasing rate of wheel-cylinder pressure is changed to be higher. As a result, wheel-cylinder pressure can be increased to the same extent as a case where both of the pressure amplifying devices 35 and 37 are normal, thereby ensuring a high braking force.

Figure 14:
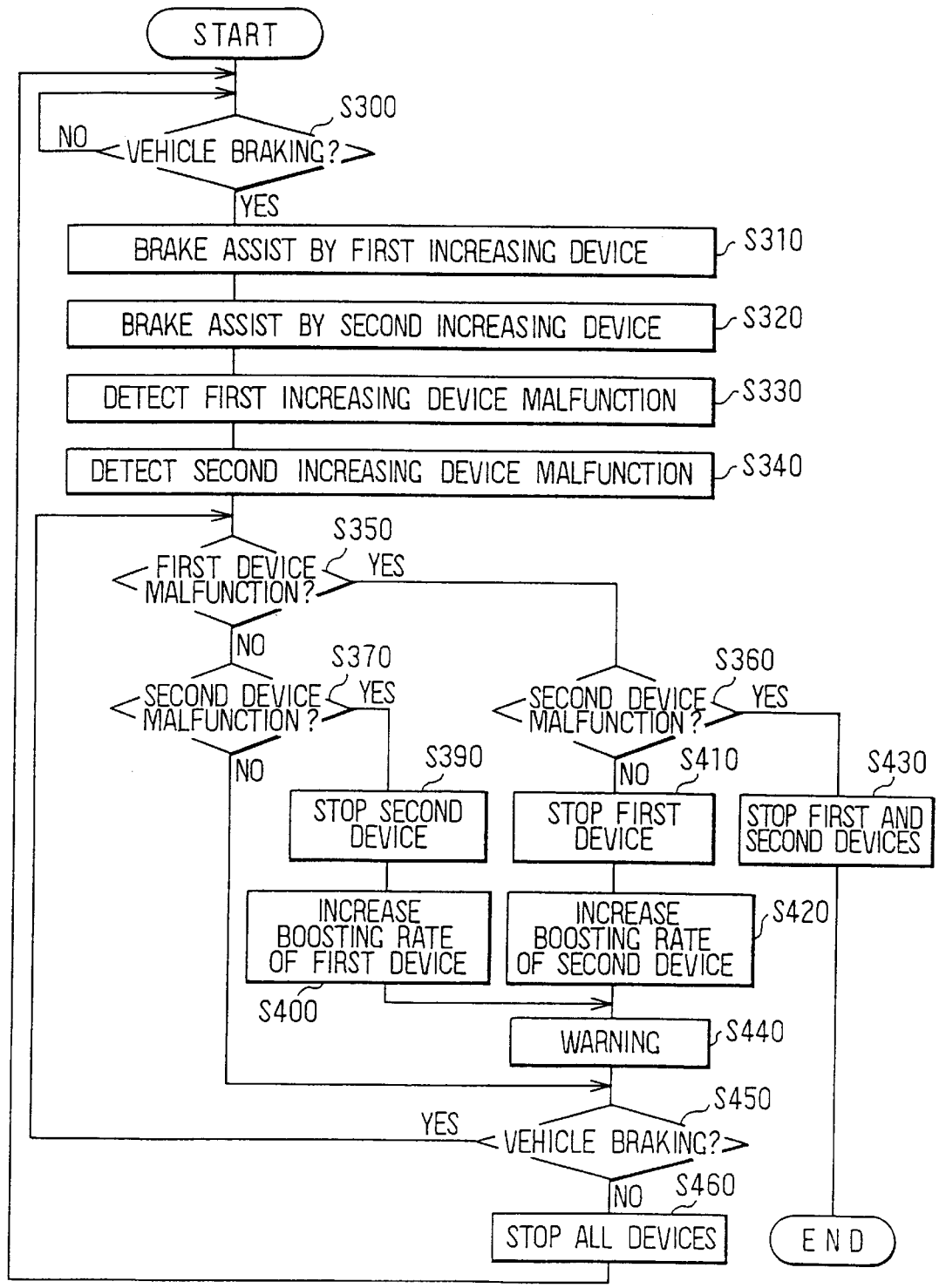
FIG. 14 is a flowchart indicating control processing in the fourth embodiment.

The electronic control unit in the fourth embodiment is the same as that in the second embodiment. Therefore, control processing to detect malfunctions of the pressure amplifying devices 35 and 37 and to be executed during the detection of the malfunction thereof will be described with reference to the flowchart in FIG. 14.

In step S300, it is determined based on a signal of the brake switch 53 or the like whether the braking operation has been performed. When an affirmative determination is made therein, the processing advances to step S310; when a negative determination is made, the same determination is repeatedly executed.

In step S310, because the braking operation has been performed, the brake assist is performed by driving the pump 47 in the pressure amplifying device 35 which is a first increasing device at a basis rotational speed.

In subsequent step S320, the pump of the pressure amplifying device 37 which is a second increasing device is caused to drive at the basic rotational speed to perform the brake assist along with the pressure amplifying device 35.

In step S330, a processing to detect the malfunction of the pressure amplifying device 35 is executed. For example, the voltage applied to the pump 47 is detected by a voltage sensor (not shown).

In step S340, a processing to detect the malfunction of the pressure amplifying device 37 is executed in the same way. For example, the voltage applied to the pump 47 is detected by a voltage sensor (not shown).

In step S350, it is determined whether the malfunction of the pressure amplifying device 35 has occurred. That is, it is determined that the malfunction of the pressure amplifying device 35 has occurred unless the voltage detected by the voltage sensor is not less than a predetermined value. When the determination herein is affirmative, the processing advances to step S360; when the determination is negative, the processing advances to step S370.

In step S370, it is determined in the same way whether the malfunction of the pressure amplifying device 37 has occurred. That is, it is determined that the malfunction of the pressure amplifying device 37 has occurred unless the voltage detected by the voltage sensor is not less than a predetermined value. When the determination herein is affirmative, the processing advances to step S390; when the determination is negative, the processing advances to step S450.

In step S450, because both the pressure amplifying devices 35 and 37 are determined to be normal in steps S350 and S370, it is determined in the same way as step S300 whether the braking operation is continuously performed. When the determination herein is affirmative, the processing returns to step S350; when the determination is negative, the processing advances to step S460.

In step S460, because the braking of the vehicle is terminated, if the pump of the pressure amplifying device is driven, the driving of the pump is stopped and the processing returns to step S300.

In step S390, because it is determined that the malfunction of the pressure amplifying device 37 which is the second increasing device has occurred, the driving of the pump 49 of the pressure amplifying device 37 is stopped.

In subsequent step S400, the rotational speed of the pump 47 of the pressure amplifying device 35 which can still work normally is increased to intensify the brake assisting force. It should be noted that an extent of the increase of the rotational speed is set to obtain a brake assisting force similar to a case where both the pressure amplifying devices 35 and 37 work normally.

In step S440, the occurrence of the malfunction is warned, thereafter, the processing of steps S450 and S460 is executed.

On the other hand, when an affirmative determination is made in step S350, it is determined in step S360 whether the malfunction of the pressure amplifying device 37 has occurred. When the determination herein is affirmative, the processing advances to step S430; when the determination is negative, the processing advances to step S410.

In step S410, because it is determined that the malfunction of the pressure amplifying device 35 which is the first increasing device has occurred, the driving of the pump 47 of the pressure amplifying device 35 is stopped.

In subsequent step S400, the rotational speed of the pump 49 of the pressure amplifying device 37 which can still work normally is increased to intensify brake assisting force. Thereafter, the processing of steps 440 to 460 are executed.

In step S430, because it is determined that both of the pressure amplifying devices 35 and 37 fall in trouble, the pumps 47 and 49 of both of the pressure amplifying devices 35 and 37 are stopped and the processing is terminated. It is to be noted that even if the driving of the pressure amplifying devices 35 and 37 is terminated, the normal braking can be effective as a result that the driver depresses the brake pedal.

In this way, according to the fourth embodiment, two pressure amplifying devices 35 and 37 are provided as devices which perform the brake assist, and if either one of the pressure amplifying devices 35 and 37 falls in trouble, the rotational speed of the pump in the normal pressure amplifying device is caused to increase. As a result, a required brake assist can be performed to obtain a high braking force. Accordingly, the brake control apparatus according to the fourth embodiment can enhance safety during the vehicle running, similar to the first embodiment.

(Fifth Embodiment)

Next, the fifth embodiment will be described.

In the fifth embodiment, if the function of the booster which is a first increasing device deteriorates, the brake assist is performed by driving a pressure amplifying device, solenoid valves and a hydraulic pump and increasing brake fluid pressure at a predetermined increasing rate.

Figure 15:
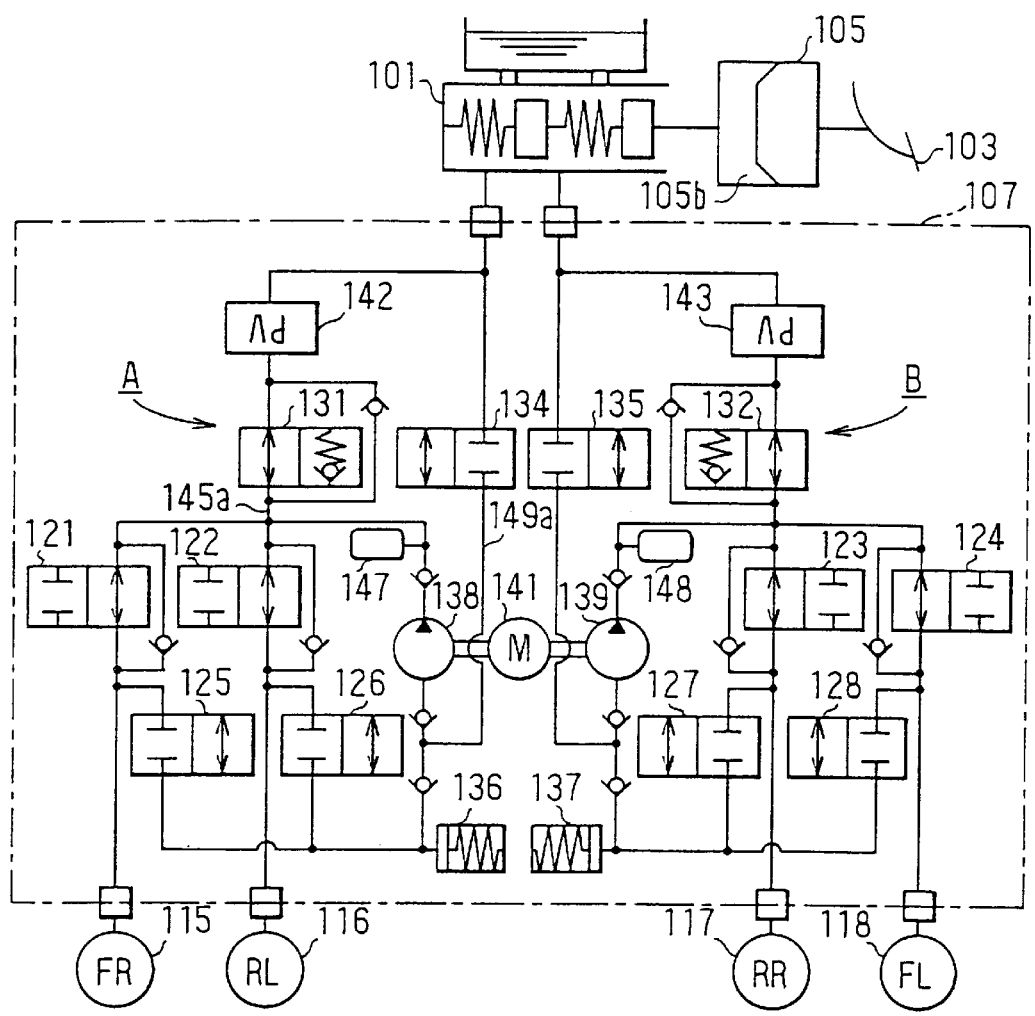
FIG. 15 is a model diagram indicating a structure of a brake control apparatus according to a fifth embodiment.

As shown in FIG. 15, the brake control apparatus according to this embodiment has a master cylinder 101, a brake pedal 103, a booster (vacuum booster) 105 and a hydraulic control circuit 107 including first and second hydraulic conduits A and B each of which is arranged as a diagonal brake-fluid conduit system.

In the hydraulic control circuit 107, a wheel cylinder 115 of a front-right (FR) wheel and a wheel cylinder 116 of a rear-left (RL) wheel are communicated through the first hydraulic conduit A. Additionally, a wheel cylinder 117 of a rear-right (RR) wheel and a wheel cylinder 1188 of a front-left (FL) wheel are communicated through the second hydraulic conduit B.

A pressure-increasing control valve 121 and a pressure-reducing control valve 125 for controlling hydraulic pressure of the wheel cylinder 115 of the FR wheel and a pressure-increasing control valve 122 and a pressure-reducing control valve 126 for controlling hydraulic pressure of the wheel cylinder 116 of the RL wheel are disposed in the first hydraulic conduit A. A pressure-increasing control valve 123 and a pressure-reducing control valve 127 for controlling hydraulic pressure of the wheel cylinder 117 of the RR wheel and a pressure-increasing control valve 124 and a pressure-reducing control valve 127 for controlling hydraulic pressure of the wheel cylinder 118 of the FL wheel are disposed in the second hydraulic conduit B.

The structure of the first hydraulic conduit A will be described hereinafter.

A master-cylinder cutoff valve (SMC valve) 133 to cause a hydraulic path 145a to be communicated or interrupted and a proportioning control valve (PV) 142 connected in reverse to increase hydraulic pressure of the wheel cylinders 115 and 116 are provided in the first hydraulic conduit A between the master cylinder 101 and the respective pressure-increasing control valves 121 and 122. This proportioning control valve 142 constitutes a pressure amplifying device (second increasing device) along with a hydraulic pump 138, similarly to the first embodiment or the like.

Additionally, a reservoir 136 to temporarily accumulate brake fluid discharged from the respective pressure-reducing control valves 125 and 126 and the hydraulic pump 138 for force-feeding brake fluid to the hydraulic path 145a are provided in the first hydraulic conduit A. An accumulator 147 to suppress pulsation in internal hydraulic pressure is disposed in a discharge path of brake fluid from the hydraulic pump 138.

Furthermore, a hydraulic path 149a to supply brake fluid from the master cylinder 101 directly to the hydraulic pump 138 to increase wheel-cylinder pressure during execution of traction control or the like is provided in the first hydraulic conduit A. Further, a reservoir cutoff valve (SRC valve) 134 to cause the hydraulic path 149a to be communicated or interrupted is disposed in the hydraulic path 149a.

Meanwhile, similarly to the foregoing first hydraulic conduit A, the pressure-increasing control valves 123 and 124, the pressure-reducing control valves 127 and 128, an SMC valve 132, a proportioning control valve 143, a reservoir 137, a hydraulic pump 139, an accumulator 148, an SRC valve 135, and so on are disposed at similar locations in the second hydraulic conduit B.

Figure 16:
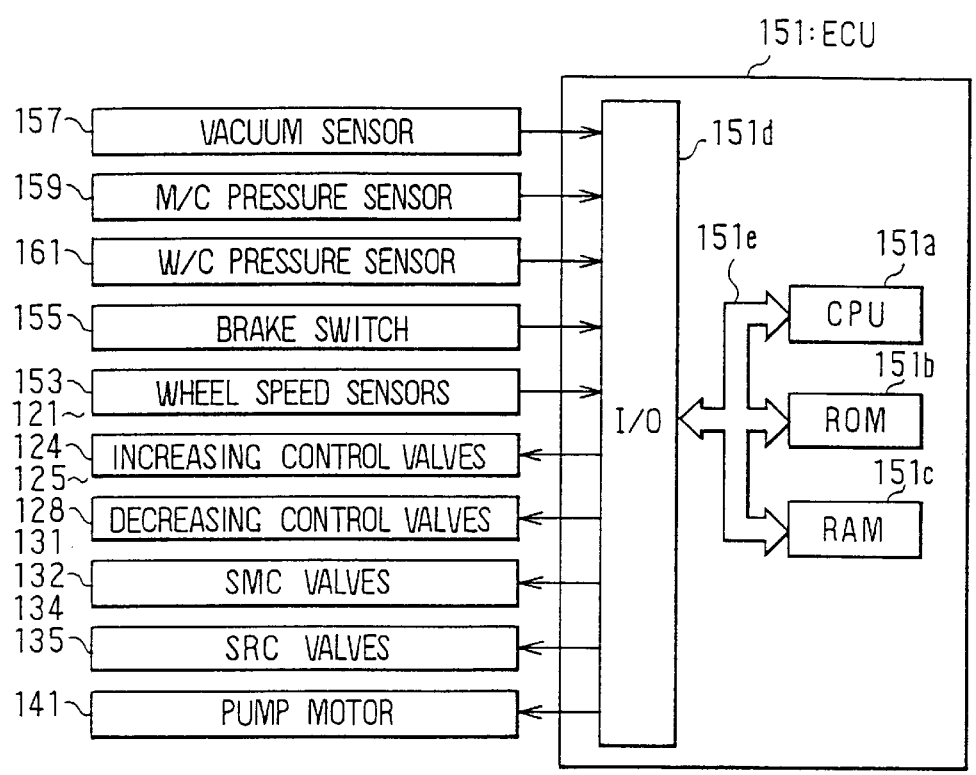
FIG. 16 is a block diagram indicating an electrical control unit of the fifth embodiment.

Additionally, as shown in FIG. 16, an ECU 151 to control the brake control apparatus according to this embodiment is made up primarily of a microcomputer provided with a CPU 151a, a ROM 151b, a RAM 151c, an input/output portion 151d, a bus line 151e, and the like of known art. Signals from wheel-speed sensors 153 disposed at the several wheels, a brake switch 155, a vacuum sensor which detects vacuum in the booster 105, an M/C pressure sensor 159 which detects master-cylinder pressure, a W/C pressure sensor 161 which detects wheel-cylinder pressure, and so on are input to the ECU 151. In addition, control signals from the ECU 151 are provided to the pressure-increasing control valves 121 to 124, the pressure-reducing control valves 125 to 128, the SMC valves 131 and 132, the SRC valves 134 and 135, and a pump motor 141.

A control processing according to this embodiment will be described next with reference to the flowchart in FIG. 17 and the graph in FIG. 18.

Figure 17:
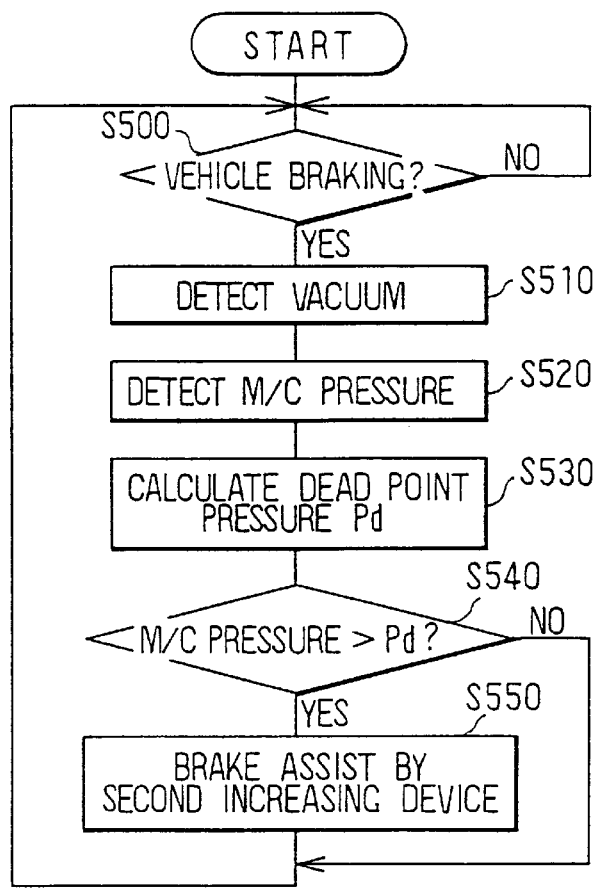
FIG. 17 is a flowchart indicating control processing in the fifth embodiment.

In step S500 in FIG. 17, it is determined whether the braking operation has been made by determining whether the brake switch 155 is on. When an affirmative determination is made herein, the processing advances to step S510; when a negative determination is made, the same determination is repeatedly executed.

In step S510, vacuum introduced in the booster 105 (i.e., a vacuum chamber therein) is detected based on a signal from the vacuum sensor 157.

In subsequent step S520, master-cylinder pressure is detected based on a signal from the M/C pressure sensor 159.

In step S530, a dead point of the booster 105 is detected. That is, as shown in FIG. 18, although an output (master-cylinder pressure) is determined in response to an input (depressing force to the brake pedal) in the booster 105, if vacuum introduced in the booster 105 does not reach a specified value, a split point (dead point) at which a relation between the output and the input, i.e., the point at which pressure increasing rate changes becomes low. This means that master-cylinder pressure Pd corresponding to the dead point lowers. The dead point pressure Pd can be detected based on the detected vacuum of the booster 105. It is to be noted that in FIG. 18, a dotted line represents a state that the function of the booster 105 deteriorates and a solid line represents a state that the function thereof is normal, i.e., the pressure PTH is the dead point pressure when the function of the booster 105 is normal.

In step S540, it is determined whether the present master-cylinder pressure exceeds the dead point pressure $P_{TH}$. When an affirmative determination is made herein, the processing advances to step S550; when a negative determination is made, the processing returns to step S500.

Figure 18:
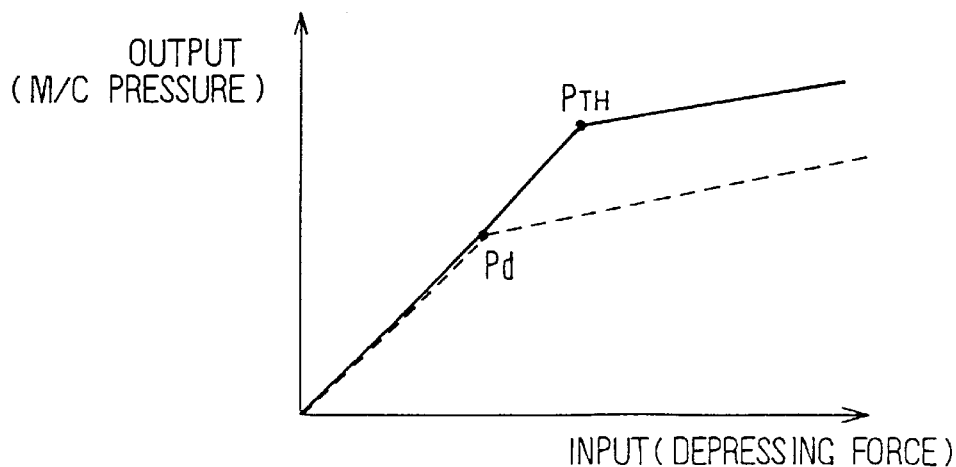
FIG. 18 is a graph indicating variation of master-cylinder pressure with respect to depressing force in the fifth embodiment.

In step S550, as shown by the solid line in FIG. 18, to compensate a boosting effect of the booster 105 of which the function deteriorates, that is, to exhibit normal boosting action by heightening the dead point pressure Pd to the original dead point pressure $P_{TH}$, the second increasing device performs the brake assist to increase brake-fluid pressure at a predetermined increasing rate and the processing returns to step S500. Specifically, the SRC valves 134 and 135 are switched on to open the hydraulic path connecting master cylinder 101 side and intake sides of the hydraulic pumps 138 and 139. Further, the pump motor 141 is switched on and the hydraulic pumps 15 and 15' are actuated. As a result, as shown in FIG. 18, the boosting action can be exhibited in response to the depressing of the brake pedal 103 so that master-cylinder pressure reaches the original dead point pressure $P_{TH}$, similarly to a case where the booster 105 is normal.

In this way, in this embodiment, the function deterioration of the booster 105 is determined based on a value of vacuum introduced in the booster 105, if the vacuum is less than the normal value, the SRC valves 134 and 135 are switched on and the pump motor 141 is also switched on to cause the hydraulic pumps 138 and 139 to operate. As a result, even if the function of the booster 105 deteriorates to some extent, the same boosting action as that performed when the booster 105 is normal can be obtained, thereby being capable of performing desirable braking operation.

It is to be noted that the hydraulic control circuit 107 is capable of performing antiskid control which control wheel-cylinder pressure to adjust the slippage of the wheels to an optimum value. However, if the malfunction of the first increasing device has occurred, the performance of antiskid control may be prohibited. Further, it is preferable that, by a method as described in the second embodiment, a malfunction of the second increasing device is attempted to be detected and antiskid control is prohibited if the malfunction of the second increasing device is detected.

(Sixth Embodiment)

Next, the sixth embodiment will be described.

Because the structure of the sixth embodiment is the same as the fifth embodiment, the description thereof is omitted.

In this embodiment, if the malfunction of the booster 105 which is a first increasing device has occurred, for example leakage of vacuum introduced in the booster, the brake assist is performed by driving a pressure amplifying device, solenoid valves and a hydraulic pump and increasing brake fluid pressure at a predetermined increasing rate.

A control processing according to this embodiment will be described next with reference to the flowchart in FIG. 19 and the graph in FIG. 20.

Figure 19:
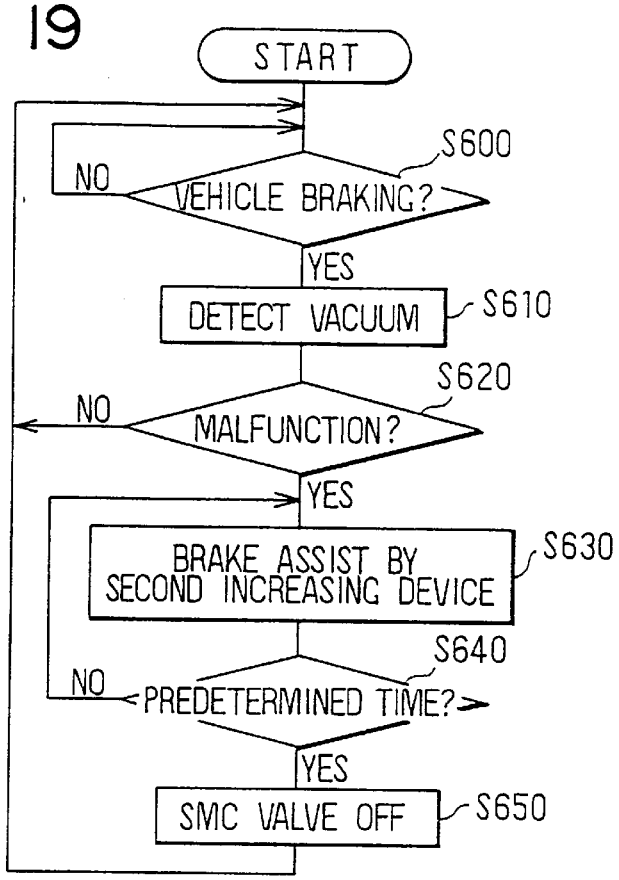
FIG. 19 is a flowchart indicating control processing in the sixth embodiment.
Figure 20:
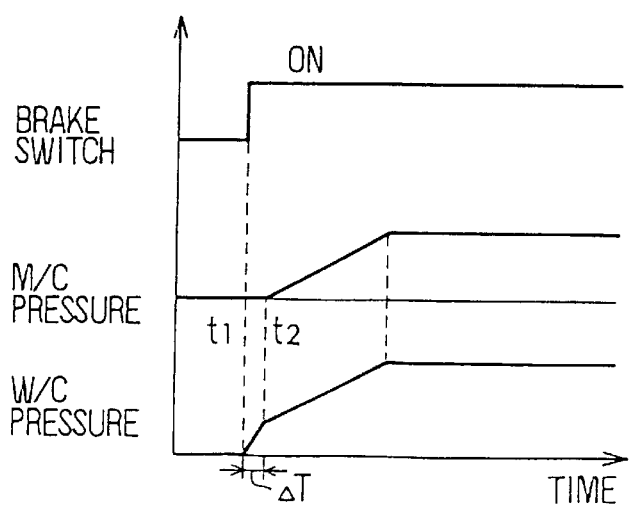
FIG. 20 is a graph indicating variation of wheel-cylinder pressure and the like in the sixth embodiment.

In step S600 in FIG. 19, it is determined whether the braking operation has been made by determining whether the brake switch 155 is on. When an affirmative determination is made herein, the processing advances to step S610; when a negative determination is made, the same determination is repeatedly executed.

In step S610, it is determined whether the malfunction of the booster has occurred by determining whether the value of vacuum introduced in the booster 105 is zero. When an affirmative determination is made therein, the processing advances to step S630; when a negative determination is made, the processing returns to step S600.

In step S630, to compensate a boosting effect of the booster 105 of which the malfunction has occurred, the second increasing device performs the brake assist to increase brake-fluid pressure at a predetermined increasing rate. Specifically, the SMC valves 131 and 132 are switched on to close the hydraulic path connecting the master cylinder 101 and the wheel cylinders 115 to 118 at a time t1 in FIG. 20. As a result, an offset pressure which is caused by springs included in the hydraulic control circuit 107 is applied to the wheel cylinders 115 to 118. In other words, braking force is generated in an initial stage during depressing the brake pedal 103 by a jumping property as a result of switching on the SMC valves 131 and 132.

Accompanying this, the SRC valves 134 and 135 are switched on to open the hydraulic path connecting master cylinder 101 side and intake sides of the hydraulic pumps 138 and 139 at the time t1, similarly to the fifth embodiment. Further, the pump motor 141 is switched on and the hydraulic pumps 15 and 15' are actuated. As a result, as shown in FIG. 20, after a rapid increase of wheel-cylinder pressure in the initial stage during depressing the brake pedal 103, wheel cylinder pressure is increased at a predetermined increasing ratio in response to the increase of master-cylinder pressure, whereby the boosting action can be exhibited, similarly to a case where the booster 105 is normal.

In step S640, it is determined whether a predetermined time period (ΔT) has elapsed. When an affirmative determination is made therein, the processing advances to step S650; when a negative determination is made, the processing returns to step S630.

In step 650, because it can be considered that the initial stage during depressing the brake pedal 103 has ended, the SMC valves 131 and 132 are switched off to open the hydraulic path at a time t2. As a result, the jumping property disappears. Thereafter, the processing returns to step S600.

In this way, in this embodiment, the malfunction of the booster 105 (leakage of vacuum introduced therein) is determined based on a value of vacuum introduced in the booster 105, if the vacuum is zero, both the SMC valves 131 and 132 and the SRC valves 134 and 135 are switched on and the pump motor 141 is also switched on to cause the hydraulic pumps 138 and 139 to operate. As a result, even if vacuum introduced in the booster 105 leaks, whereby booster 105 cannot exhibit boosting effect at all, the same boosting action as that performed when the booster 105 is normal can be obtained, thereby being capable of performing desirable braking operation.

In particular, because deceleration of the vehicle can be increased when the driver further depresses the brake pedal and an additional braking force can be generated in initial stage during the depressing of the brake pedal, a remarkable affect can be obtained such that the driver never has an uncertain feeling.

It is to be noted that although the occurrence of the malfunction of the booster is determined when the vacuum introduced therein is zero, even in a case where vacuum introduced in the booster is a small value less than a predetermined value (i.e., the function of the booster 105 deteriorates to large extent) the control processing similar to this embodiment may be performed.

The present invention is not limited to the foregoing embodiments but can be modified in various ways as described below.

Figure 21:
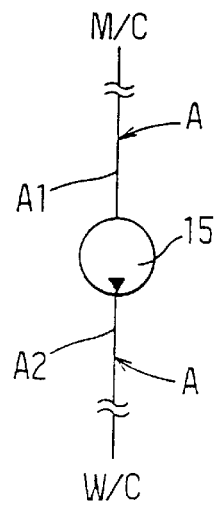
FIG. 21 is a drawing indicating a structure of a modification of a pressure amplifying device.

(1) In the first embodiment, the pressure amplifying device 10 was composed of the pump 15 and the proportional control valve 13. However, the pressure amplifying device 10 is not limited to this, a simple structure that is composed of only the pump 15 disposed in the first conduit A as shown in FIG. 21 can be adopted as the pressure amplifying device 10.

(2) In the first embodiment, the following devices can be adopted instead of the proportioning control valve 13.

Figure 22A:
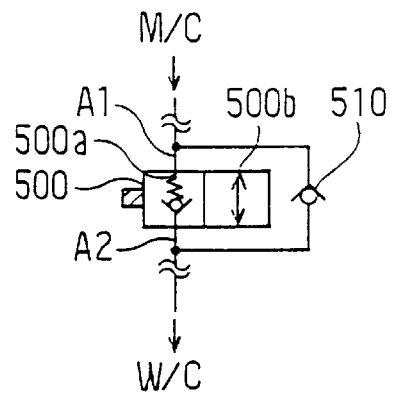
FIGS. 22A, 22B and 22C are drawings indicating structures of modifications of the proportioning control valve.

(2-1) As shown in FIG. 22A, a two-way solenoid valve 500 which has a port 500a with a differential pressure valve inserted therein and a port 500b to realize a communicated state can be used instead of the proportioning control valve 13. It is to be noted that a check valve 510 is connected in parallel to the two-way solenoid valve 500.

Figure 22B:
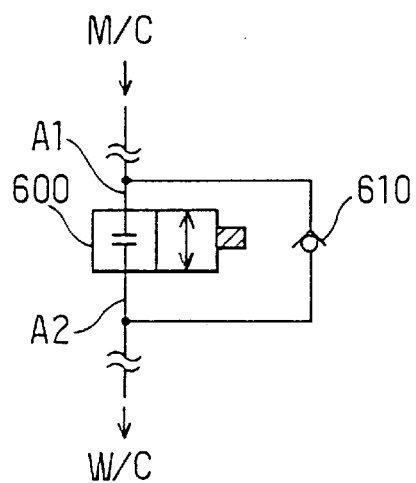
Figure 22C:
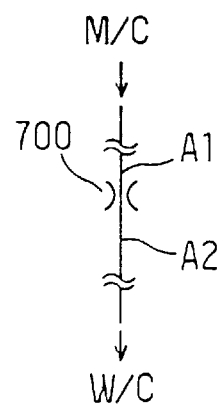

(2-2) As shown in FIG. 22B, a two-way solenoid valve 600 provided merely with an interrupted position and a communicated position can be employed instead of the proportioning control valve 13. It is to be noted that a check valve 610 is connected in parallel to the two-way solenoid valve 600.

(2-3) As shown in FIG. 14C, a restrictor 700 can be employed instead of the proportioning control valve 13.

(3) In the fifth and sixth embodiments, the function deterioration or the malfunction of the booster 105 is detected based on the magnitude of vacuum introduced in the vacuum chamber of the booster 105. However, the function deterioration or the malfunction of the booster may be detected according to the other method.

For example, even if the vacuum sensor is not provided, the function deterioration or the malfunction of the booster can be assumed when the driver uses a pumping brake operation or the like. Based on an assumed result like this, the control processing of the sixth embodiment may be performed.

(4) In the foregoing embodiments, although the vacuum booster was described as a booster, a hydraulic booster can be used as a booster as well. As a method of detecting the malfunction or function deterioration of the hydraulic booster, for example, a method can be adopted such that the malfunction or the function deterioration of the hydraulic booster is determined by detecting an abnormality in pressure of a high pressure fluid supplied by a high pressure supplying source such as a accumulator or a pump.

What is claimed is:

1. A brake control apparatus for a vehicle, said brake control apparatus comprising:

a master cylinder which generates master-cylinder pressure to a wheel cylinder in accordance with a brake pedal operation applied by a driver of said vehicle, said brake pedal operation causing a depressing force to be applied to said brake pedal, said depressing force being translated to a force applied to a pressure-creating member causing an increase in said master-cylinder pressure;

a booster which boosts said force applied to said pressure-creating member;

a wheel cylinder which generates a wheel braking force in response to said master-cylinder pressure;

a conduit disposed between and coupled to said master cylinder and said wheel cylinder;

an assist mechanism disposed between and coupled to said master cylinder and said wheel cylinder via said conduit, said assist mechanism being actuated to apply to said wheel cylinder a brake fluid pressure higher than said master-cylinder pressure by moving brake fluid from said master cylinder into a portion of said conduit coupling said wheel cylinder to said assist mechanism;

detecting means for detecting a malfunction of said booster; and control means for actuating said assist mechanism to increase said brake fluid pressure applied to said wheel cylinder when said detecting means detects said malfunction of said booster.

2. The apparatus according to claim 1, wherein said assist mechanism increases said brake fluid pressure applied to said wheel cylinder by a predetermined pressure when said detecting means detects said malfunction of said booster.

3. The apparatus according to claim 1, wherein said assist mechanism increases said brake fluid pressure applied to said wheel cylinder in response to an increase in said depressing force applied to said brake pedal by said driver, when said detecting means detects no malfunction of said booster.

4. The apparatus according to claim 3, wherein said control means increases a rate with which said assist mechanism increases said brake fluid pressure applied to said wheel cylinder, when said detecting means detects said malfunction of said booster.

5. The apparatus according to claim 1, wherein said booster comprises a vacuum booster.

6. The apparatus according to claim 1, wherein said booster comprises a hydraulic booster.

7. The apparatus according to claim 1, wherein said assist mechanism comprises a hydraulic pump which moves brake fluid into said master cylinder and discharges said brake fluid from said master cylinder into said portion of said conduit coupling said wheel cylinder to said assist mechanism, said assist mechanism further comprising a proportioning valve disposed between and coupled to said master cylinder and said wheel cylinder, said proportioning valve maintaining said brake fluid pressure applied to said wheel cylinder higher than said master cylinder pressure.

8. The apparatus according to claim 1, wherein said detecting means detects said malfunction of said booster based upon a relationship between a deceleration of said vehicle and said brake pedal operation applied by said driver.

9. The apparatus according to claim 1, wherein said detecting means detects said malfunction of said booster based upon an amount of pressure introduced in said booster to cause said booster to operate.

10. The apparatus according to claim 1, wherein said detecting means detects said malfunction of said booster when one of said master-cylinder pressure and said brake fluid pressure applied to said wheel cylinder rises to a value greater than a predetermined value.

11. The apparatus according to claim 1, wherein said detecting means detects said malfunction of said booster based upon a relationship between a deceleration of said vehicle and said brake pedal operation by said driver.

12. The apparatus according to claim 1, wherein said detecting means detects said malfunction of said booster when a deceleration of said vehicle is less than a predetermined value and a stroke of said brake pedal by said driver is greater than a predetermined stroke.

13. The apparatus according to claim 1, wherein said detecting means detects said malfunction of said booster when a deceleration of said vehicle is less than a predetermined value and said depressing force applied to said brake pedal is greater than a predetermined force.

14. The apparatus according to claim 1, further comprising:
a warning device which warns said driver of said vehicle of an occurrence of said malfunction of said booster when said detecting means detects said malfunction of said booster.

15. The apparatus according to claim 1, further comprising:
an anti-skid control device which controls brake fluid pressure applied to said wheel cylinder to adjust an amount of slippage of a wheel; and
prohibiting means for prohibiting said anti-skid control device from controlling said brake fluid pressure when said detecting means detects said malfunction of said booster.

16. The apparatus according to claim 1, wherein said booster increases said depressing force applied to said brake pedal.

17. The apparatus according to claim 1, wherein said malfunction of said booster comprises at least one of a ceasing of functioning of said booster and a function deterioration of said booster.

18. A brake control apparatus for a vehicle, said brake control apparatus comprising:
a master cylinder which generates master-cylinder pressure to a wheel cylinder in accordance with a brake pedal operation applied by a driver of said vehicle, said brake pedal operation causing a depressing force to be applied to said brake pedal, said depressing force being translated to a force applied to a pressure-creating member causing an increase in said master-cylinder pressure;

a booster which boosts said force applied to said pressure-creating member;

a wheel cylinder which generates a wheel braking force in response to said master-cylinder pressure;

a conduit disposed between and coupled to said master cylinder and said wheel cylinder;

an assist mechanism disposed between and coupled to said master cylinder and said wheel cylinder via said conduit, said assist mechanism being actuated to apply to said wheel cylinder a brake fluid pressure higher than said master-cylinder pressure by moving brake fluid from said master cylinder into a portion of said conduit coupling said wheel cylinder to said assist mechanism;

a malfunction signaler which signals a malfunction of said booster; and an actuator which actuates said assist mechanism to increase said brake fluid pressure applied to said wheel cylinder when said malfunction signaller signals said malfunction of said booster.

* * * * *